(12) United States Patent
Ogawa

(10) Patent No.: US 11,084,363 B2
(45) Date of Patent: Aug. 10, 2021

(54) SEALING STRUCTURE

(71) Applicant: NISHIKAWA RUBBER CO., LTD., Hiroshima (JP)

(72) Inventor: Hirofumi Ogawa, Hiroshima (JP)

(73) Assignee: NISHIKAWA RUBBER CO., LTD., Hiroshima (JP)

( * ) Notice: Subject to any disclaimer, the term of this patent is extended or adjusted under 35 U.S.C. 154(b) by 40 days.

(21) Appl. No.: 16/657,483

(22) Filed: Oct. 18, 2019

(65) Prior Publication Data

US 2021/0114447 A1 Apr. 22, 2021

(51) Int. Cl.
| E06B 7/16 | (2006.01) |
| B60J 10/86 | (2016.01) |
| B60J 10/25 | (2016.01) |
| B60J 10/24 | (2016.01) |

(52) U.S. Cl.
CPC ............... *B60J 10/86* (2016.02); *B60J 10/24* (2016.02); *B60J 10/25* (2016.02)

(58) Field of Classification Search
CPC ............ B60J 10/86; B60J 10/24; B60J 10/25
USPC ........................................................ 49/479.1
See application file for complete search history.

(56) References Cited

U.S. PATENT DOCUMENTS

| 6,409,256 B1* | 6/2002 | Page ..................... B60R 13/04 296/203.01 |
| 2002/0035806 A1* | 3/2002 | Yamashita ............... B60J 10/24 49/498.1 |
| 2003/0177700 A1* | 9/2003 | Nakai ....................... B60J 10/80 49/479.1 |
| 2005/0050800 A1* | 3/2005 | Ueda ........................ B60J 10/80 49/479.1 |
| 2013/0019538 A1* | 1/2013 | Watson .................... B60J 10/24 49/484.1 |
| 2013/0097936 A1* | 4/2013 | Fukuda .................... B60J 5/105 49/476.1 |

FOREIGN PATENT DOCUMENTS

| DE | 102017008872 A | 3/2019 |
| JP | 2005186647 A | 7/2005 |
| JP | 200688984 | 4/2006 |
| JP | 2018099994 | 6/2018 |
| JP | 2019166872 | 10/2019 |

OTHER PUBLICATIONS

Extended European Search Report for 19170322.2, dated Sep. 27, 2019, 7 pages.

* cited by examiner

*Primary Examiner* — Jerry E Redman
(74) *Attorney, Agent, or Firm* — Casimir Jones, SC; Robert A. Goetz

(57) ABSTRACT

Curling of a connection part of a second sealing member is avoided, the curling occurring in a case where the second sealing member is brought into elastic contact with a first sealing member. An end part of a third inner wall, which end part is located on a connection-part side, is thinner than the other part of the third inner wall, and at least a tip of the connection part is located on a vehicle-interior side of a vehicle-interior-side side surface of the third inner wall. A first curved wall and a second curved wall are brought into contact with each other in a case where a first end part and a second end part are caused to abut each other.

5 Claims, 5 Drawing Sheets

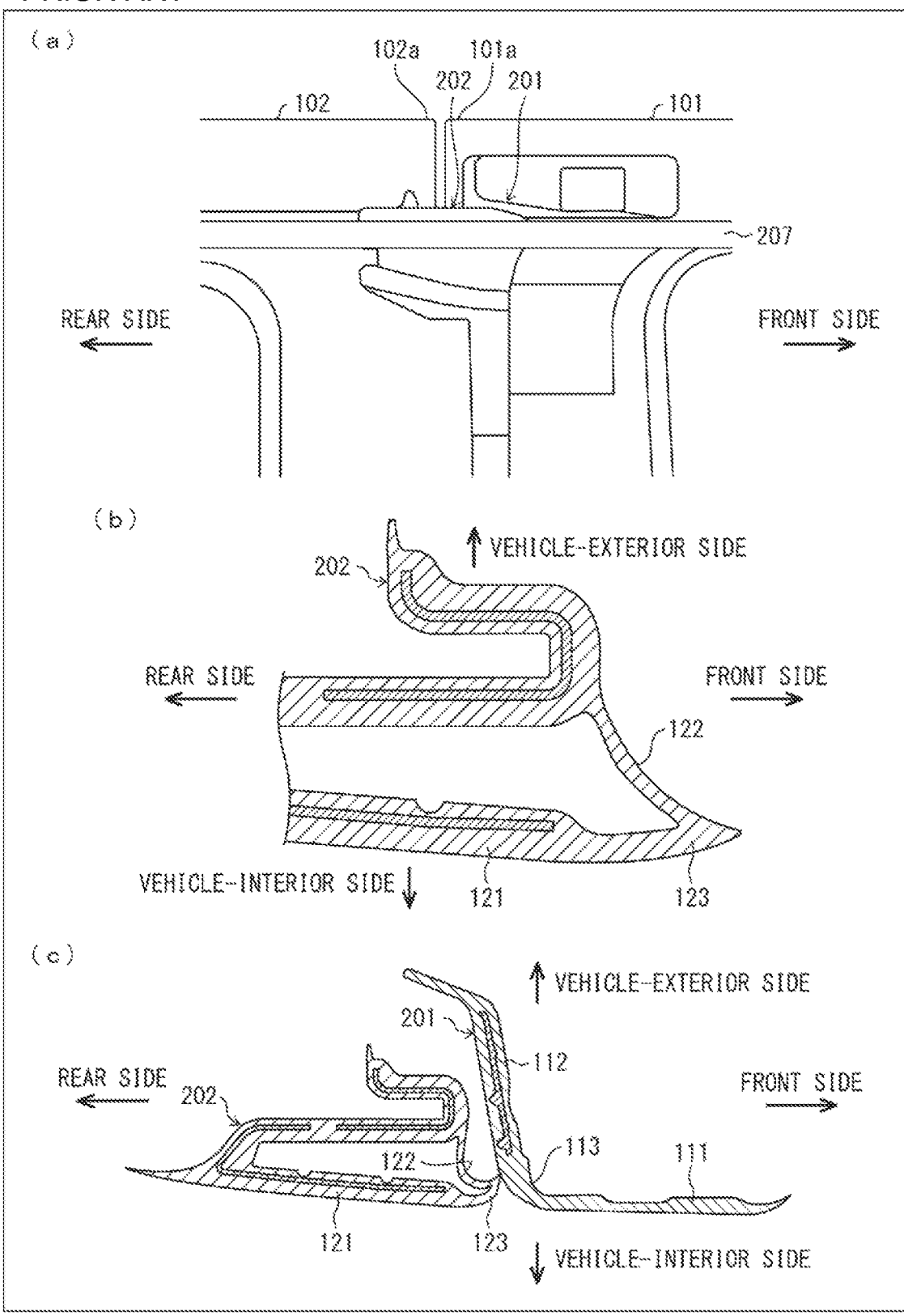

SEALING STRUCTURE

TECHNICAL FIELD

Figure 1:
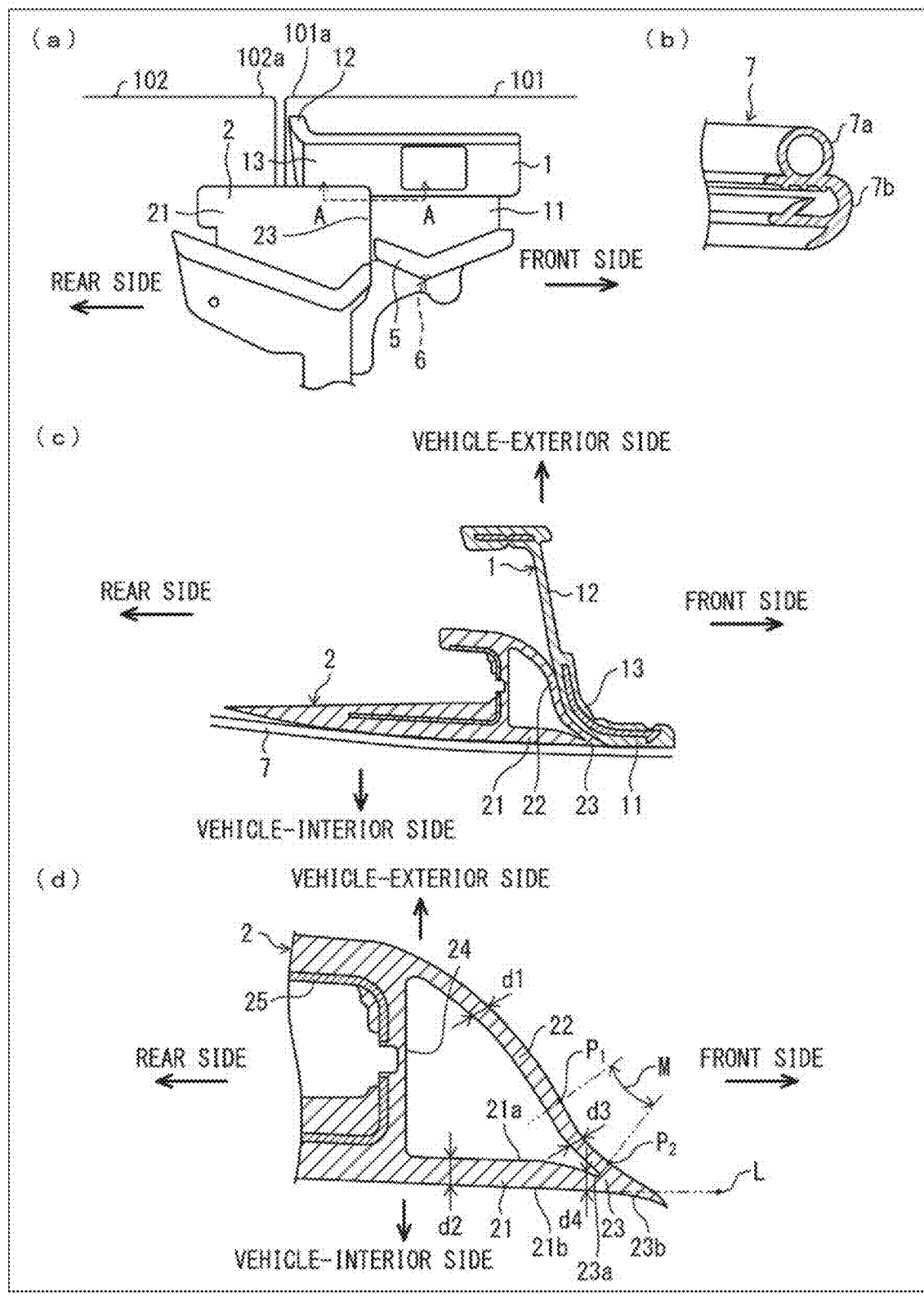

The present invention relates to a sealing structure of a part of a center-pillarless automotive vehicle at which part a first end part of a first door, a second end part of a second door, and a main weather strip which is provided along a body opening periphery are caused to abut each other.

BACKGROUND ART

Conventionally, there has been a center-pillarless automotive vehicle configured such that (i) a hinged door (a first door) and a sliding door (a second door) are each independently movable, (ii) the hinged door is joined to an automotive body with use of a hinge and is rotated so as to be opened and closed, and (iii) the sliding door is opened and closed by means of a sliding mechanism.

Along a body opening periphery of an automotive vehicle of this type, a main weather strip 207 illustrated in (a) of FIG. 5 is provided as a main seal so that water is prevented from entering the automotive vehicle. However, since a space is present between a first door 101 and a second door 102, water leakage occurs. In order that this water leakage is avoided, a sealing member 201 is provided to an upper part of a first end part 101a of the first door 101, and a sealing member 202 is provided to an upper part of a second end part 102a of the second door 102. This causes a sealing surface to be formed.

Furthermore, according to a conventional technique disclosed in FIG. 5 of Patent Literature 1, a tip of each of an upper die-molded part and a lower die-molded part of a weather strip for a second door (hereinafter, referred to as a second door weather strip) has a shape of a wedge so that insufficient insertion of the tip of the each of the upper die-molded part and the lower die-molded part is avoided.

CITATION LIST

Patent Literature

[Patent Literature 1]
Japanese Patent Application Publication Tokukai No. 2006-88984 (Published on Apr. 6, 2006)

SUMMARY OF INVENTION

Technical Problem

According to the conventional technique, in a state where the first door 101 and the second door 102 are closed, the sealing surface against the main weather strip 207 shifts in a direction from a front side to a rear side of the automotive vehicle, that is, shifts from the first door 101 to the sealing member 201, shifts from the sealing member 201 to the sealing member 202, and shifts from the sealing member 202 to the second door 102. Therefore, in order to keep good watertightness in a state where the first door 101 and the second door 102 are closed, it is necessary to minimize a clearance (so-called a triangular clearance), which is created on the sealing surface, between the first door 101 and the sealing member 201, a clearance between the sealing member 202 and the second door 102, and a clearance between the sealing member 201 and the sealing member 202 in a case where the first door 101 and the second door 102 are closed.

In order to attain the above object, it is also necessary to arrange a sealing surface shifting part of the sealing member 202 illustrated in (b) of FIG. 5 such that a thickness of a connection part 123, via which a second curved wall 122 and a third inner wall 121 are connected to each other, is decreased.

As described above, the second door 102 includes a sliding mechanism, and the first door 101 and the second door 102 are each independently openable and closable. Therefore, in a case where the second door 102 is opened and closed in a state where the thickness of the connection part 123 of the sealing member 202 is decreased, curling of the connection part 123 occurs, as illustrated in (c) of FIG. 5, when the sealing member 202 is brought into elastic contact with the sealing member 201.

In view of the above, according to a technique disclosed in FIGS. 1 and 2 of Patent Literature 1, such curling is avoided by (i) causing die-molded parts of a weather strip for a front door (hereinafter, referred to as a front door weather strip) and the upper die-molded part and the lower die-molded part of the second door weather strip not to be brought into elastic contact with each other before the front door weather strip and the second door weather strip are brought into elastic contact with a body-side weather strip and (ii) causing a flange F, to which the main weather strip 207 is attached, to move to a vehicle-exterior side for sealing after the first door 101 and the second door 102 are closed.

That is, the technique disclosed in Patent Literature 1 is not for avoiding curling of a tip of each of an upper die-molded part and a lower die-molded part of a second door weather strip which curling occurs in a case where the second door weather strip is brought into elastic contact with a front door weather strip after the front door weather strip is brought into elastic contact with a main weather strip. This structure makes a structure of a body of an automotive vehicle complicated, and is therefore not realistic.

An aspect of the present invention has been made in view of the above problem, and an object of the aspect of the present invention is to realize a sealing structure which allows avoidance of curling of a connection part of a second sealing member which curling occurs in a case where the second sealing member is brought into elastic contact with a first sealing member.

Solution to Problem

In order to attain the above object, a sealing structure in accordance with an aspect of the present invention is a sealing structure of a part of a center-pillarless automotive vehicle at which part a first end part of a first door, a second end part of a second door, and a main weather strip which is provided along a body opening periphery are caused to abut each other, including: a first sealing member which is provided to an upper part of the first end part; and a second sealing member which is provided to an upper part of the second end part, the first sealing member being configured such that a first inner wall, which is located on a vehicle-interior side, and a second inner wall, which is brought into elastic contact with the second sealing member, are connected to each other via a first curved wall, which is curved so as to protrude to a second-sealing-member side, the second sealing member being configured such that a third inner wall, which is located on the vehicle-interior side, and a second curved wall, which is curved in a case where the second curved wall is brought into elastic contact with the first sealing member, are connected to each other via a connection part, which is tapered as the connection part extends toward the first sealing member, an end part of the third inner wall, which end part is located on a connection-part side, being thinner than the other part of the third inner wall, at least a tip of the connection part being located on a vehicle-interior side of a surface of the third inner wall which surface is located on the vehicle-interior side, the first curved wall and the second curved wall being brought into contact with each other in a case where the first end part and the second end part are caused to abut each other.

Advantageous Effects of Invention

According to an aspect of the present invention, it is possible to avoid curling of a connection part of a second sealing member which curling occurs in a case where the second sealing member is brought into elastic contact with a first sealing member.

BRIEF DESCRIPTION OF DRAWINGS (a) of FIG. 1 is an elevational view illustrating a left door sealing structure in accordance with an embodiment of the present invention, as viewed from a vehicle-interior side. (b) of FIG. 1 is a perspective view illustrating a main weather strip. (c) of FIG. 1 is a cross-sectional view which is taken from a line A-A illustrated in (a) of FIG. 1. (d) of FIG. 1 is an enlarged cross-sectional view illustrating a second sealing member, which view is taken from the line A-A.

Figure 2:
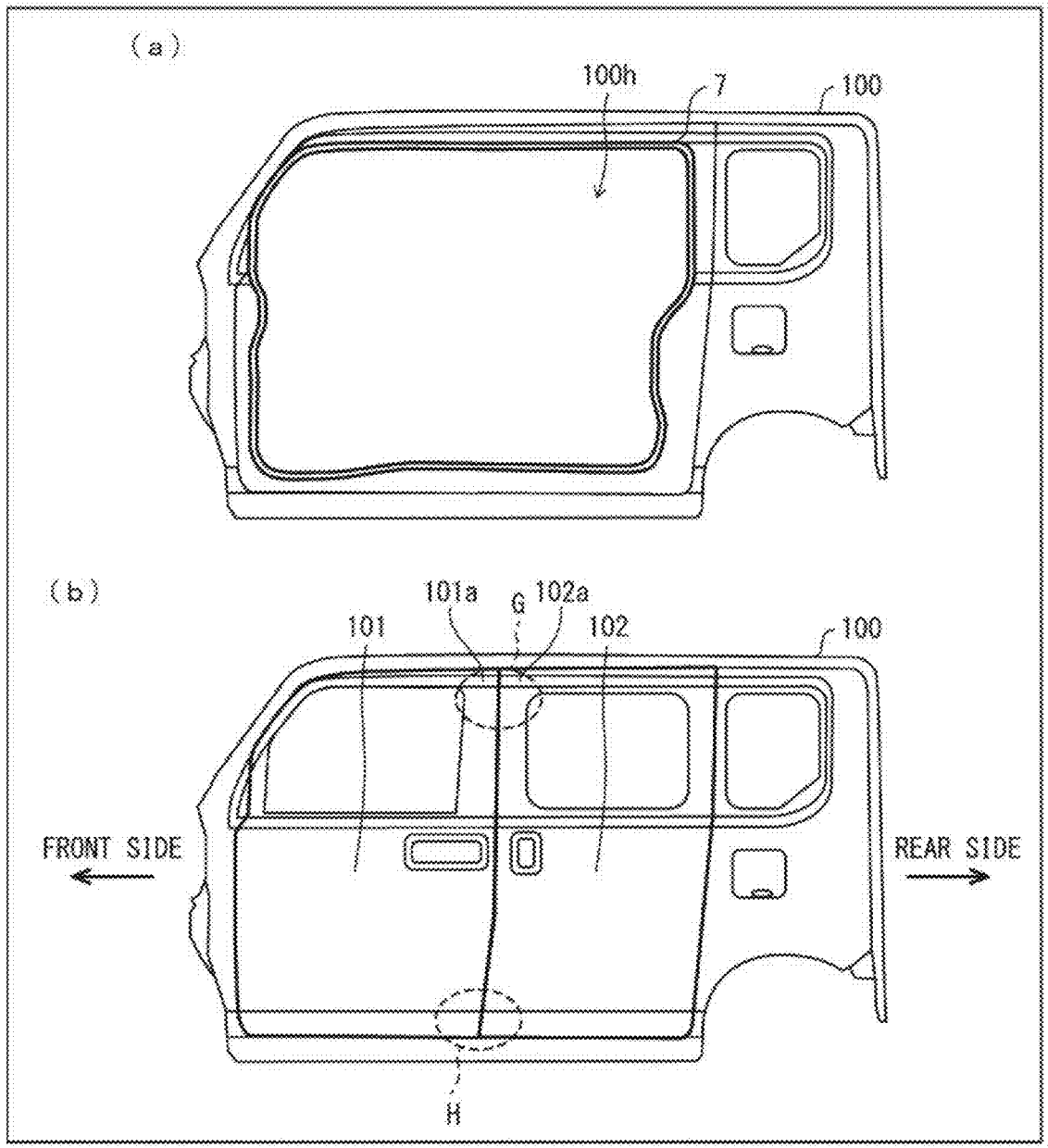

(a) of FIG. 2 is a side view illustrating a left side of a center-pillarless automotive vehicle from which left side a first door and a second door are both detached, as viewed from a vehicle-exterior side. (b) of FIG. 2 is a side view illustrating the left side of the center-pillarless automotive vehicle to which left side the first door and the second door are both attached.

Figure 3:
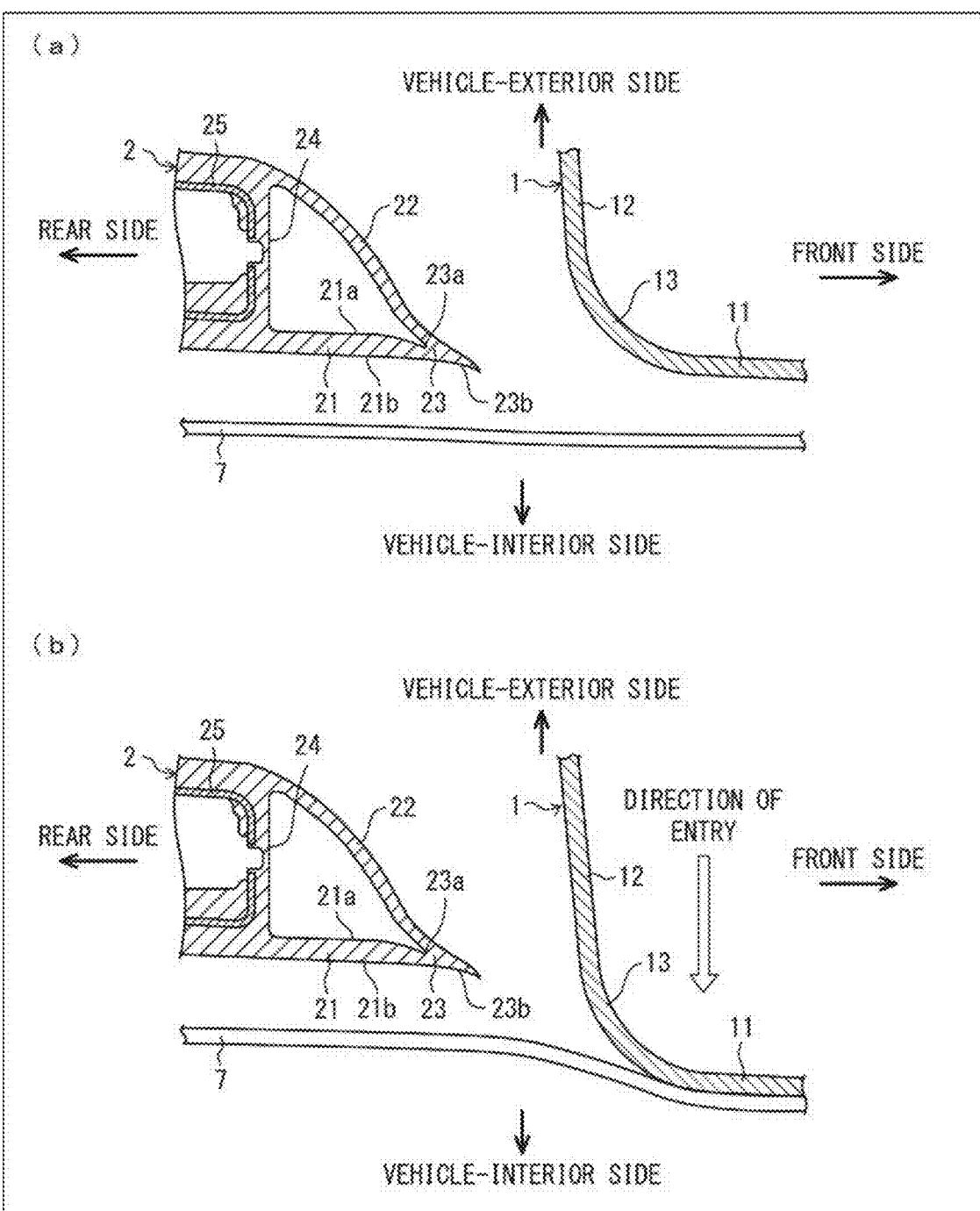

(a) of FIG. 3 is a cross-sectional view illustrating a state where a first sealing member, the second sealing member, and the main weather strip have not been brought into elastic contact with each other yet. (b) of FIG. 3 is a cross-sectional view illustrating a state where a first inner wall of the first sealing member is brought into elastic contact with the main weather strip (that is, a state where the first door is first closed) from the state illustrated in (a) of FIG. 3.

Figure 4:
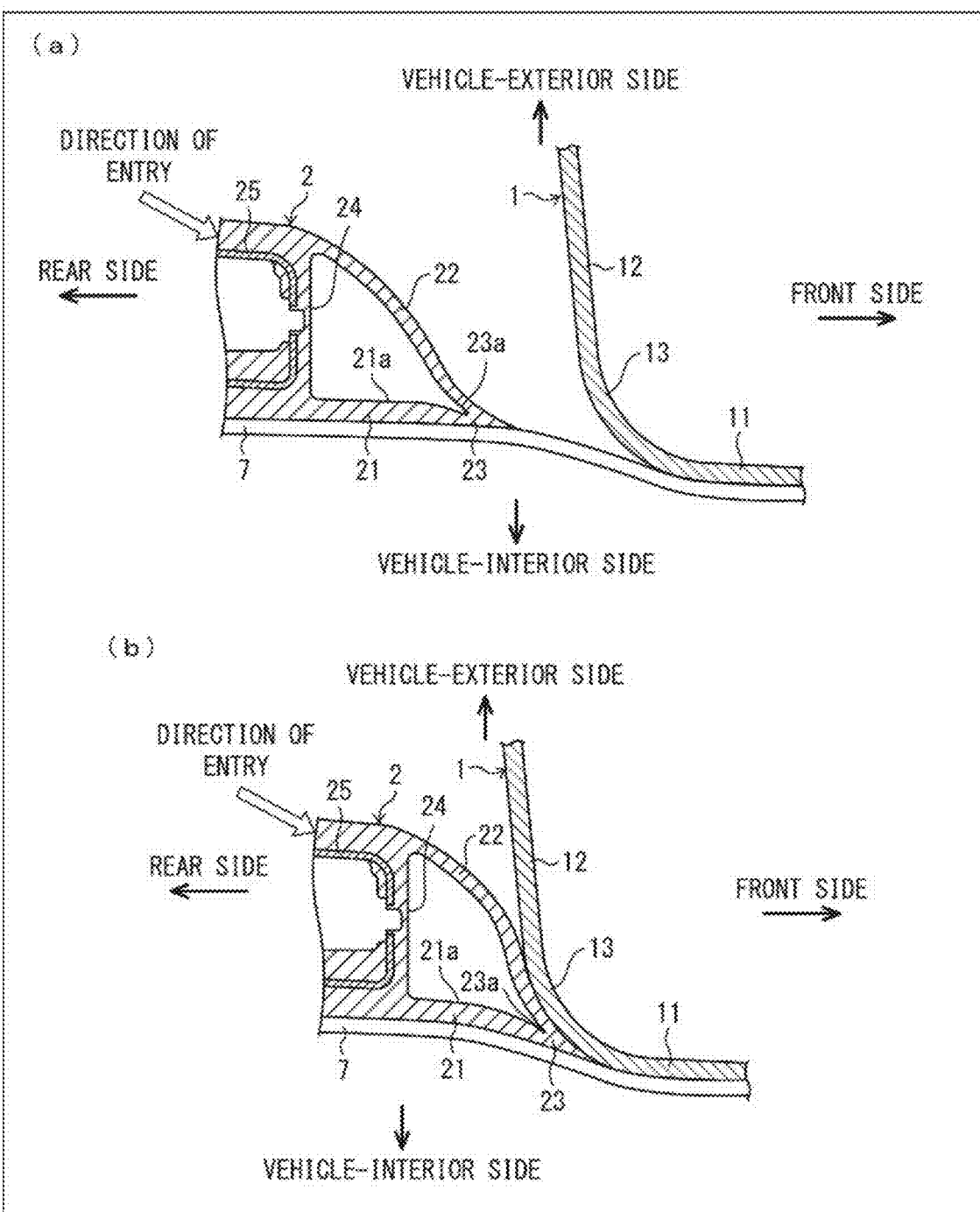

(a) of FIG. 4 is a cross-sectional view illustrating a state where a third inner wall of the second sealing member starts to be brought into elastic contact with the main weather strip (that is, a state where the first door is first closed and the second door starts to be closed subsequently) from the state illustrated in (b) of FIG. 3. (b) of FIG. 4 is a cross-sectional view illustrating a state where a second curved wall of the second sealing member is brought into elastic contact with a first curved wall of the first sealing member (that is, a state where the second door finishes being closed subsequently) from the state illustrated in (a) of FIG. 4.

(a) of FIG. 5 is an elevational view illustrating a conventional left door sealing structure (including a main weather strip), as viewed from a vehicle-interior side. (b) of FIG. 5 is a cross-sectional view illustrating a cross-sectional structure, in a vicinity of a connection part, of a conventional second sealing member. (c) of FIG. 5 is a cross-sectional view for explaining a problem which arises in a case where the conventional second sealing member is brought into elastic contact with a first sealing member.

DESCRIPTION OF EMBODIMENTS

[Outline of Structure of Side Part of Center-Pillarless Automotive Vehicle]

As illustrated in (a) of FIG. 2, a side part 100 of a center-pillarless automotive vehicle (hereinafter, merely referred to as an "automotive vehicle") has a body opening in which a center pillar is not present. A main weather strip 7 is provided along a body opening periphery 100h of the body opening. The main weather strip 7 includes a hollow sealing part 7a and an attachment base 7b (see (b) of FIG. 1).

Note that a sealing structure described below is a sealing structure of a part G at which a first end part 101a of a first door 101 and a second end part 102a of a second door 102 are caused to abut each other, as illustrated in (b) of FIG. 2. More specifically, the sealing structure in accordance with the present embodiment is a sealing structure of a part at which the first end part 101a of the first door 101 (the hinged door), the second end part 102a of the second door 102 (the sliding door), and the main weather strip 7 which is provided along the body opening periphery 100h are caused to abut each other.

[Outline of Sealing Structure]

Here, a first sealing member 1 is provided to an upper part of the first end part 101a of the first door 101 as illustrated in (a) of FIG. 1, which corresponds to a view illustrating the sealing structure of the part G, illustrated in (b) of FIG. 2, as viewed from a vehicle-interior side. The first sealing member 1 is a weather strip which is brought into elastic contact with the main weather strip 7 so that sealing performance between the first sealing member 1 and the main weather strip 7 is ensured.

Meanwhile, a second sealing member 2 is provided to an upper part of the second end part 102a of the second door 102. The second sealing member 2 is a weather strip which is brought into elastic contact with the main weather strip 7 so that sealing performance between the second sealing member 2 and the main weather strip 7 is ensured. Note that (a) of FIG. 1 illustrates (i) the first sealing member 1 in the form of a perspective view as viewed from diagonally above from a rear side and (ii) the second sealing member 2 in the form of an elevational view as viewed from the vehicle-interior side.

As a material from which each of the first sealing member 1 and the second sealing member 2 is molded, an elastic material such as synthetic rubber or TPE (thermoplastic elastomer) is used. Examples of the synthetic rubber include EPDM (ethylene-propylene-diene copolymer rubber). Examples of the TPE (thermoplastic elastomer) include TPO (olefin-based thermoplastic elastomer). The elastic material used can be a foamed material or can be alternatively a non-foamed material. Furthermore, a core member made of metal, a hard and rigid resin, or the like can be embedded in the elastic material for the purpose of ensuring rigidity. For example, a core member 25 made of metal, a hard and rigid resin, or the like is embedded in the rear side of a connection wall 24 of the second sealing member 2 (see (d) of FIG. 1).

As illustrated in (a) of FIG. 1, a water receiving part 5 is provided on a first inner wall 11 of the first sealing member 1. A drain hole 6, through which water received by the water receiving part 5 is drained to an outside of the automobile vehicle, is provided in a vicinity of a bottom part of the water receiving part 5. This allows water, received by the water receiving part 5, to be ultimately discharged to the outside of the automotive vehicle through the water drain hole 6.

As illustrated in (c) of FIG. 1, the first sealing member 1 is configured such that the first inner wall 11, which is located on the vehicle-interior side, and a second inner wall 12, which is brought into elastic contact with the second sealing member 2, are connected to each other via a first curved wall 13, which is curved so as to protrude to a second-sealing-member-2 side.

The second sealing member 2 is configured such that a third inner wall 21, which is located on the vehicle-interior side, and a second curved wall 22, which is curved in a case where the second curved wall 22 is brought into elastic contact with the first sealing member 1, are connected to each other via a connection part 23, which is tapered as the connection part 23 extends toward the first sealing member 1.

Note that (c) of FIG. 1 illustrates a state where the second curved wall 22 of the second sealing member 2 and the second inner wall 12 (or the first curved wall 13) of the first sealing member 1 have been brought into elastic contact with each other. As illustrated in (c) of FIG. 1, in a case where the second curved wall 22 and the connection part 23 are brought into elastic contact with the second inner wall 12 and the first curved wall 13, the second curved wall 22 and the connection part 23 are elastically deformed so that the second curved wall 22 and the connection part 23 are brought into close contact with the second inner wall 12 and the first curved wall 13. This causes sealing performance between the second curved wall 22 and the second inner wall 12 to be ensured.

As illustrated in (d) of FIG. 1, a thin wall part 23a is provided on a connection-part-23 side of a vehicle-exterior-side side surface 21a (surface located on a vehicle-exterior side) of the third inner wall 21. The thin wall part 23a is such a part that an end part of the third inner wall 21 which end part is located on the connection-part-23 side is thinner than the other part of the third inner wall 21. That is, a thickness d4 of the end part of the third inner wall 21 is thinner than a thickness d2 of the other part of the third inner wall 21 (see (d) of FIG. 1). Furthermore, the thickness d4 of the end part is gradually decreased toward a tip of the connection part 23. By thus suppressing a significant increase in thickness, in a vicinity of the connection part 23, of the third inner wall 21, a triangular clearance, which occurs in a case where the second sealing member 2 is brought into elastic contact with the first sealing member 1, is easily minimized.

Meanwhile, a curved part 23b is provided on the connection-part-23 side of a vehicle-interior-side side surface 21b (surface located on the vehicle-interior side) of the third inner wall 21. The curved part 23b is curved so as to be depressed to the vehicle-interior side. The curved part 23b is such a part that at least the tip of the connection part 23 is curved so that the tip is located slightly on the vehicle-interior side of a line L extending from the vehicle-interior-side side surface 21b of the third inner wall 21.

The curved part 23b causes the first sealing member 1 and the second sealing member 2 to be brought into surface contact with each other between (i) a start of contact of the first sealing member 1 with the second sealing member 2 ((a) of FIG. 4) and (ii) an end of the contact of the first sealing member 1 with the second sealing member 2 ((b) of FIG. 4). This causes a broadened range in which it is possible to avoid curling of the connection part 23. As a result, it is possible to deal with a case where variations in automotive body structure are considerable. For example, according to a connection part 23 having a conventional configuration, curling of the connection part 23 occurs unless the variations in automotive body structure are small, that is, the variations fall within a range of ±1 mm. However, according to the connection part 23 having the foregoing configuration, it is possible to cause curling of the connection part 23 not to occur even in a case where the variations in automotive body structure fall within a range of ±2 mm.

As illustrated in (c) of FIG. 1, by causing the first end part 101a and the second end part 102a to abut each other, the first curved wall 13 and the second curved wall 22 are brought into contact (elastic contact) with each other.

According to the above configuration, the thin wall part 23a is provided on the connection-part-23 side of the vehicle-exterior-side side surface 21a of the third inner wall 21. That is, the end part of the third inner wall 21, which end part is located on the connection-part-23 side, is thinner than the other part of the third inner wall 21. This causes the connection part 23 to be more easily curved due to its elastic deformation in a case where the first curved wall 13 and the second curved wall 22 are brought into contact with each other.

Moreover, according to the above configuration, the curved part 23b is provided on the connection-part-23 side of the vehicle-interior-side side surface 21b of the third inner wall 21, the curved part 23b being curved so as to be depressed to the vehicle-interior side. That is, at least the tip of the connection part 23 is located on the vehicle-interior side of the line L extending from the vehicle-interior-side side surface 21b of the third inner wall 21. This causes the connection part 23 to be more easily curved to the vehicle-interior side due to its elastic deformation.

Thus, in a case where the first end part 101a and the second end part 102a are caused to abut each other and, consequently, the first curved wall 13 and the second curved wall 22 are brought into contact with each other, that is, in a case where the second sealing member 2 is brought into elastic contact with the first sealing member 1, the connection part 23 is brought into elastic contact with the first curved wall 13 and is easily curved to the vehicle-interior side. It is therefore possible to avoid curling of the connection part 23 of the second sealing member 2.

As illustrated in (d) of FIG. 1, the thickness d2 of the third inner wall 21 is greater than a thickness d1 of the second curved wall 22. More specifically, the thickness d2 is approximately 1.3 times to 2.0 times greater than the thickness d1. This allows the second curved wall 22 to be easily elastically deformed while allowing rigidity of the main weather strip 7 with respect to elastic contact to be ensured. Since elastic deformation of the second curved wall 22 causes the first curved wall 13 and the second curved wall 22 to be in close contact with each other, it is possible to increase sealing performance between the first sealing member 1 and the second sealing member 2.

Furthermore, the second curved wall 22 in accordance with the present embodiment is curved so as to, on the rear side, protrude to the vehicle-exterior side and so as to, on a front side, be depressed to the vehicle-exterior side. This causes the second curved wall 22 to be easily brought into closer contact with the first curved wall 13. Therefore, it is possible to cause a sealing surface to be smoother, the sealing surface being formed in a case where the second sealing member 2 is brought into elastic contact with the first sealing member 1.

Moreover, the second sealing member 2 has the connection wall 24 via which the third inner wall 21 and the second curved wall 22 are connected to each other. This allows a further increase in rigidity of the second sealing member 2 with respect to elastic contact with the main weather strip 7.

At least a part M of the second curved wall 22 in accordance with the present embodiment, which part M is curved so as to, on the front side, be depressed to the vehicle-interior side, is generally uniform in thickness (note, here, that the part M is defined as, in (d) of FIG. 1, a part between (i) a change point P1 at which the second curved wall 22 changes from protruding to the vehicle-interior side to being depressed to the vehicle-interior side and (ii) a point P2 at which the second curved wall 22 is connected to the connection part 23). For example, a thickness d3 of the part M on the front side is substantially uniform. Note that the thickness d1 on the rear side can be set so as to be substantially identical to the thickness d3 on the front side or can be alternatively set so as to be slightly greater than the thickness d3 on the front side as necessary. This allows a decrease in total thickness during deformation also at the connection part 23 at which the thickness of the third inner wall 21 and the thickness of the second curved wall 22 are added up. Therefore, it is possible to minimize a triangular clearance which occurs in the vicinity of the connection part 23.

[State Transition of Sealing Structure]

A state illustrated in (a) of FIG. 3 is a state where the first sealing member 1, the second sealing member 2, and the main weather strip 7 are not in elastic contact with each other. In a case where the first inner wall 11 of the first sealing member 1 is first brought into elastic contact with the main weather strip 7 (that is, in a case where the first door 101 is first closed along a direction of entry) in the state illustrated in (a) of FIG. 3, a transition to a state illustrated in (b) of FIG. 3 occurs. In this state, the first inner wall 11 and the main weather strip 7 are in close contact with each other so that sealing is provided between the first inner wall 11 and the main weather strip 7. Further, the main weather strip 7 is elastically deformed so as to be depressed to the vehicle-interior side due to elastic contact with the first inner wall 11.

Next, in a case where the third inner wall 21 of the second sealing member 2 starts to be brought into elastic contact with the main weather strip 7 (that is, in a case where the second door 102 starts to be closed subsequently along the direction of entry) in the state illustrated in (b) of FIG. 3, a transition to a state illustrated in (a) of FIG. 4 occurs. In this state, the third inner wall 21 and the main weather strip 7 start to be in close contact with each other so that sealing starts to be provided between the third inner wall 21 and the main weather strip 7.

Thereafter, in a case where the second curved wall 22 of the second sealing member 2 is further brought into elastic contact with the second inner wall 12 (the first curved wall 13) of the first sealing member 1 (that is, in a case where the second door 102 finishes being closed along the direction of entry) in the state illustrated in (a) of FIG. 4, a transition to a state illustrated in (b) of FIG. 4 occurs. In this state, a triangular clearance is minimized at a part at which the first sealing member 1, the second sealing member 2, and the main weather strip 7 are caused to abut each other. This is because the curved part 23b is elastically deformed due to elastic contact with the main weather strip 7 and, accordingly, the tip of the connection part 23 and the main weather strip 7 are brought into close contact with each other so that sealing is provided between the connection part 23 and the main weather strip 7.

[Recap]

In order to attain the above object, a sealing structure in accordance with an aspect of the present invention is a sealing structure of a part of a center-pillarless automotive vehicle at which part a first end part of a first door, a second end part of a second door, and a main weather strip which is provided along a body opening periphery are caused to abut each other, including: a first sealing member which is provided to an upper part of the first end part; and a second sealing member which is provided to an upper part of the second end part, the first sealing member being configured such that a first inner wall, which is located on a vehicle-interior side, and a second inner wall, which is brought into elastic contact with the second sealing member, are connected to each other via a first curved wall, which is curved so as to protrude to a second-sealing-member side, the second sealing member being configured such that a third inner wall, which is located on the vehicle-interior side, and a second curved wall, which is curved in a case where the second curved wall is brought into elastic contact with the first sealing member, are connected to each other via a connection part, which is tapered as the connection part extends toward the first sealing member, an end part of the third inner wall, which end part is located on a connection-part side, being thinner than the other part of the third inner wall, at least a tip of the connection part being located on a vehicle-interior side of a surface of the third inner wall which surface is located on the vehicle-interior side, the first curved wall and the second curved wall being brought into contact with each other in a case where the first end part and the second end part are caused to abut each other.

According to the above configuration, the end part of the third inner wall, which end part is located on the connection-part side, is thinner than the other part of the third inner wall. This causes the connection part to be more easily curved due to its elastic deformation in a case where the first curved wall and the second curved wall are brought into contact with each other. Furthermore, at least the tip of the connection part is located on the vehicle-interior side of the surface of the third inner wall which surface is located on the vehicle-interior side. This causes the connection part to be more easily curved to the vehicle-interior side due to its elastic deformation.

Thus, in a case where the first end part and the second end part are caused to abut each other and, consequently, the first curved wall and the second curved wall are brought into contact with each other, that is, in a case where the second sealing member is brought into elastic contact with the first sealing member, the connection part is brought into elastic contact with the first curved wall, and is easily curved to the vehicle-interior side. It is therefore possible to avoid curling of the connection part of the second sealing member.

The sealing structure in accordance with an aspect of the present invention is preferably arranged such that the other part of the third inner wall is thicker than the second curved wall. The above configuration allows the second curved wall to be easily elastically deformed while allowing rigidity of the main weather strip with respect to elastic contact to be ensured. Since elastic deformation of the second curved wall causes the first curved wall and the second curved wall to be in close contact with each other, it is possible to increase sealing performance between the first sealing member and the second sealing member.

The sealing structure in accordance with an aspect of the present invention is preferably arranged such that the second curved wall is curved so as to, on a rear side, protrude to a vehicle-exterior side and so as to, on a front side, be depressed to the vehicle-exterior side. The above configuration causes the second curved wall to be easily brought into closer contact with the first curved wall. Therefore, it is possible to cause a sealing surface to be smoother, the sealing surface being formed in a case where the second sealing member is brought into elastic contact with the first sealing member.

The sealing structure in accordance with an aspect of the present invention is preferably arranged such that the other part of the third inner wall is substantially uniform in thickness, and has a shape of a substantially straight line. The above configuration allows a further increase in rigidity of the second sealing member with respect to elastic contact with the main weather strip.

The sealing structure in accordance with an aspect of the present invention is preferably arranged such that at least a part of the second curved wall, which part is curved so as to, on a front side, be depressed to a vehicle-exterior side, is uniform in thickness. The above configuration allows a decrease in total thickness during deformation also at the connection part at which a thickness of the third inner wall and a thickness of the second curved wall are added up. Therefore, it is possible to minimize a triangular clearance which occurs in a vicinity of the connection part.

[Supplementary Note]

In the foregoing embodiment, only an example of the part G has been described, the part G being an upper one of parts located on a left side of the automotive vehicle (see FIG. 2), at which parts the hinged door as the first door 101, which is attached as a side front door, and the sliding door as the second door 102, which is attached as a side rear door, are caused to abut each other. However, the present invention can be applied to a part H which is a lower one of the parts located on the left side of the automotive vehicle (see FIG. 2). Similarly, the present invention can be applied to right doors and also can be applied to back doors.

The present invention is not limited to the embodiments, but can be altered by a skilled person in the art within the scope of the claims. The present invention also encompasses, in its technical scope, any embodiment derived by combining technical means disclosed in differing embodiments. Further, it is possible to form a new technical feature by combining the technical means disclosed in the respective embodiments.

REFERENCE SIGNS LIST

1 First sealing member
2 Second sealing member
7 Main weather strip
11 First inner wall
12 Second inner wall
13 First curved wall
21 Third inner wall
21a Vehicle-exterior-side side surface (surface on vehicle-exterior side)
21b Vehicle-interior-side side surface (surface on vehicle-interior side)
22 Second curved wall
23 Connection part
23a Thin wall part
23b Curved part
24 Connection wall
100h Body opening periphery
101 First door (Hinged door)
101a First end part
102 Second door (Sliding door)
102a Second end part

The invention claimed is:

1. A sealing structure of a part of a center-pillarless automotive vehicle at which part a first end part of a first door, a second end part of a second door, and a main weather strip which is provided along a body opening periphery are caused to abut each other, comprising:
 a first sealing member which is provided to an upper part of the first end part; and
 a second sealing member which is provided to an upper part of the second end part,
 the first sealing member being configured such that a first inner wall, which is located on a vehicle-interior side, and a second inner wall, which is brought into elastic contact with the second sealing member, are connected to each other via a first curved wall, which is curved so as to protrude to a second-sealing-member side,
 the second sealing member being configured such that a third inner wall, which is located on the vehicle-interior side, and a second curved wall, which is curved such that the second curved wall is brought into elastic contact with the first sealing member, are connected to each other via a connection part, which is tapered as the connection part extends toward the first sealing member,
 an end part of the third inner wall, wherein the end part is located on a connection-part side, being thinner than an other part of the third inner wall,
 at least a tip of the connection part being located on a vehicle-interior side of a surface of the third inner wall which surface is located on the vehicle-interior side,
 the first curved wall and the second curved wall being brought into contact with each other such that the first end part and the second end part are caused to abut each other.

2. The sealing structure as set forth in claim 1, wherein the other part of the third inner wall is thicker than the second curved wall.

3. The sealing structure as set forth in claim 1, wherein the second curved wall is curved so as to, on a rear side, protrude to a vehicle-exterior side and so as to, on a front side, be depressed to the vehicle-exterior side.

4. The sealing structure as set forth in claim 3, wherein at least a part of the second curved wall, wherein the part of the second curved wall is curved so as to, on a front side, be depressed to a vehicle-exterior side, is uniform in thickness.

5. The sealing structure as set forth in claim 1, wherein the other part of the third inner wall is substantially uniform in thickness, and has a shape of a substantially straight line.

* * * * *